May 31, 1966 L. T. FUQUA 3,254,169
TURN SIGNAL CANCELING CAM
Filed April 16, 1964
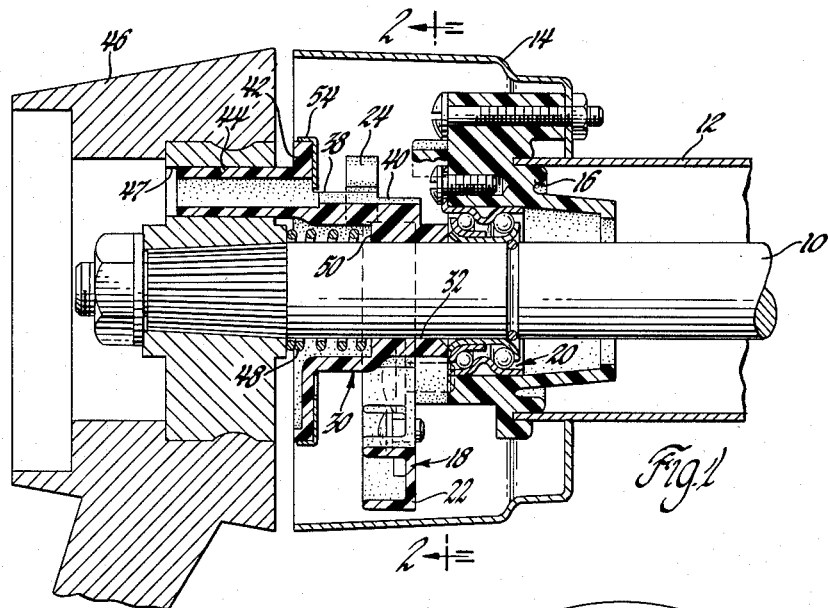
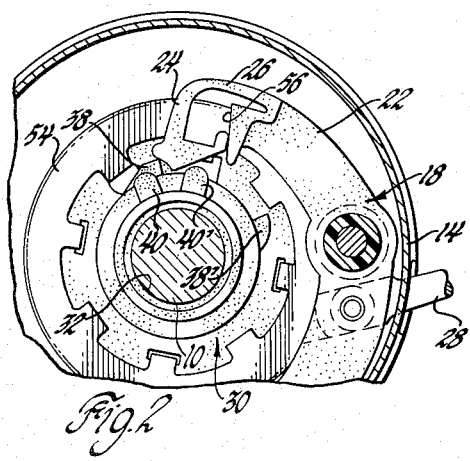
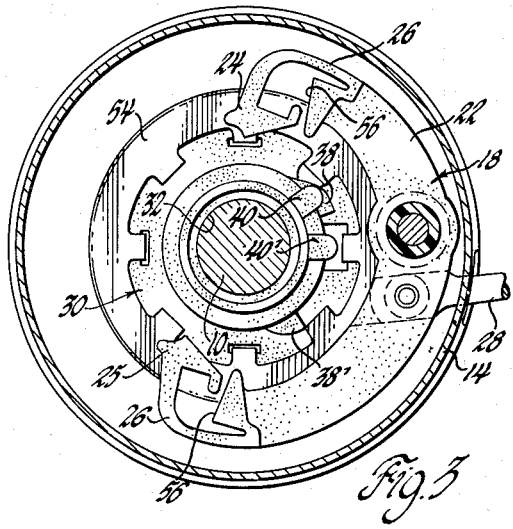
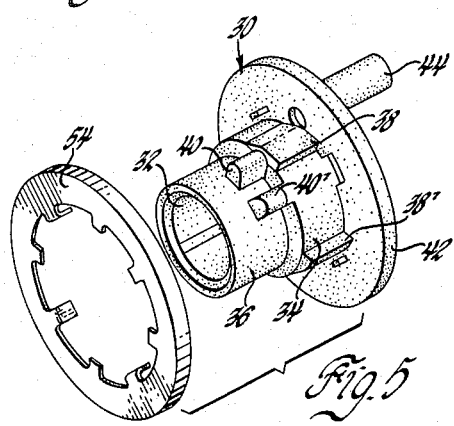
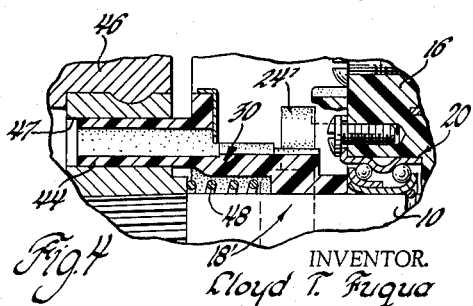
INVENTOR.
Lloyd T. Fuqua
BY
Hugh L. Fisher
ATTORNEY

United States Patent Office 3,254,169
Patented May 31, 1966

3,254,169
TURN SIGNAL CANCELING CAM
Lloyd T. Fuqua, Fortville, Ind., assignor to General Motors Corporation, Detroit, Mich., a corporation of Delaware
Filed Apr. 16, 1964, Ser. No. 360,247
5 Claims. (Cl. 200—61.34)

This invention relates to improvements in turn signal mechanisms and more particularly to a novel bi-level canceling device.

The canceling device of the present invention is adapted for use in a turn signaling device of the type comprising a support portion which carries the turn signal switch and pivotally supports an actuator plate which is adapted to close and open the turn signal switch in response to movement toward or away from the steering shaft. The canceling device is mounted so as to rotate with the steering wheel and is adapted to return the actuator plate to a neutral position after completion of the turn.

In assembly line production of motor vehicles, parts which may be used on different models or makes represent an important factor in efficient operation of the line. The canceling device of the present invention is adapted to cancel either one of two different turn signaling mechanisms which may be installed on the vehicle. The two turn signaling mechanisms operate in the same manner but the actuator plates of the mechanisms are located at different axial positions relative to the steering shaft, and the actuator pawls do not travel the same distance toward the axis of the steering shaft when the actuator plate is moved from neutral to an actuated position. Heretofore, this has required separate canceling devices placed at different locations along the steering shaft or steering wheel in order to properly return the mechanisms to neutral position. It was necessary, therefore, to install the actuator plate and the correct canceling device as a complete unit on the vehicle; or if these two separate units were installed at different locations, it was necessary to make certain that the parts matched. The canceling device of the present invention is provided with separate sets of canceling cams located on separate levels of the device so as to cancel the turn signal mechanism regardless of which of the two mechanisms referred to above are installed on the vehicle.

Other advantages of the present invention will be apparent to those skilled in the art from the following detailed description which should be taken in conjunction with the drawings in which:

FIGURE 1 is a sectional view of a turn signaling mechanism including the canceling device of the present invention;

FIGURE 2 is a sectional view taken along lines 2—2 of FIGURE 1 and showing the actuator plate in a turn indicating position;

FIGURE 3 is a sectional view similar to FIGURE 2 and showing the actuator plate in a neutral or canceled position;

FIGURE 4 is a sectional view similar to FIGURE 1 but showing the canceling device operating with a different actuator plate; and FIGURE 5 is a perspective view of the canceling device.

Referring now to the drawings and initially to FIGURE 1, the reference numeral 10 designates a motor vehicle steering shaft which extends through a steering column 12. A generally cylindrical housing 14 is secured by conventional means to the upper end of the steering column 12. Located within the housing 14 is a turn signaling mechanism comprising a moulded plastic support member 16 and a moulded plastic crescent-shaped actuator plate 18. The support member 16 is secured to the housing 14 and pivotally supports the actuator plate 18. The support member 16 is apertured to receive the shaft 10 and carries a bearing generally designated 20 for rotatably supporting the shaft 10. The support member 16 also carries a turn signal switch, not shown, of the type shown in application Serial No. 208,695 assigned to the assignee of the present invention; and the actuator plate 18 has a projecting finger, not shown, which cooperates with the switch for closing and opening the switch contacts in response to pivoting of the actuator plate 18 toward or away from the shaft 10.

As best shown in FIGURES 2 and 3, the actuator plate 18 includes a main body 22 terminating in inwardly-turned pawls 24 and 25 connected by a thin resilient section 26. The actuator plate 18 may be pivoted to a right or left turn indicating position by means of a turn signal lever 28 which is secured thereto and extends through the housing 14 where it is easily accessible to the driver.

Referring now to FIGURES 1 and 5, a moulded plastic canceling device generally designated 30 is provided for automatically returning the actuator plate 18 to a neutral position from a right or left turn indicating position after the completion of a turn. The canceling device 30 has a stepped cylindrical bore 32. The outer surface of the canceling device 30 is also stepped to provide upper and lower surfaces 34 and 36, respectively. Integrally formed on the upper surface 34 is a pair of circumferentially-spaced cams 38 and 38'. A second pair of circumferentially-spaced canceling cams 40 and 40' are integrally formed on the lower surface 36. The upper surface 34 terminates in a circular flange 42 having a transversely-extending hollow boss 44. A steering wheel 46 is removably secured to the upper end of the steering shaft 10 and is provided with a bore 47 adapted to receive the boss 44 so that the canceling device 30 is rotatable with the steering wheel 46. A spring 48 surrounds the shaft 10 and extends between the steering wheel 46 and the transverse inner wall 50 of the canceling device 30. Suitably attached to the circular flange 42 is the horn ring contact 54. Electrical current conducting means, not shown, are adapted to be received by the hollow boss 44 to electrically ground the ring contact 54 when the vehicle driver desires to sound the horn. A stationary horn brush contact, not shown, is carried by the support member 16 and connects the ring contact with the normal horn energizing circuit.

As shown in FIGURE 3, when the actuator plate 18 is in a neutral position, both the pawls 24 and 25 will be clear of the canceling cams 38 and 38' of the canceling device 30. However, when the actuator plate 18 is pivoted, for example, to a right turn indicating position as shown in FIGURE 2, the upper pawl 24 will be placed in the path of the canceling cams 38 and 38'. When the steering wheel 46 is rotated in the direction of the indicating turn, the canceling cams 38 and 38' will touch the interfering pawl 24 and move it aside momentarily but due to the resilience of the section 26, will not change the position of the actuator plate 18. When the steering wheel 46 is rotated in the other direction, the cam 38' will once again move the pawl 24 aside, but the cam 38 will contact the pawl 24 and push it against the relatively rigid portion 56 of the actuator plate 18 which allows only a slight flexing of the pawl 24. When the pawl 24 will move no further with respect to the actuator plate 18, then the actuator plate 18 will be forced back to neutral position by the continued rotation of the steering wheel 46. Although not shown in the drawings, both the actuator plate 18 and the support member 16 are provided with cam means such as shown in the aforementioned application Serial No. 208,695 for maintaining the actuator plate 18 in the position to which it is manually moved until returned either manually or by the canceling device 30 to a neutral position. The operation of the mechanism is similar for a left turn indication with the cam 38' engaging the pawl 25 and returning the actuator plate 18 to neutral position.

As indicated previously, the canceling device 30 is provided with a second set of canceling cams 40 and 40' adapted to cancel a different turn signaling mechanism wherein the actuator plate is spaced axially from the position of the actuator plate 18 and travels further inwardly toward the axis of the shaft 10 than does the actuator plate 18 which as described above is adapted to cooperate with the canceling cams 38 and 38'. The second turn signaling mechanism is shown in FIGURE 4 wherein the reference numeral 18' designates the actuator plate of the mechanism. The actuator plate 18' is similar in structure to the actuator plate 18 but is located a greater distance away from the steering wheel 46 along the axis of the shaft 10 and during pivoting to an actuated position, travels further toward the axis of the shaft 10. In all other respects the mechanism is the same as that shown in FIGURE 1. The canceling operation of the canceling device 30 is the same as hereinbefore described with respect to the actuator 18 except that the canceling cams 40 and 40' engage the pawls 24' or 25', only one of which is shown in FIGURE 4, to return the actuator plate 18' to a neutral position after completion of a turn.

It is thus apparent that the novel canceling device of the present invention is adapted to cancel either one of two different signaling mechanisms which may be installed on the vehicle. Since the canceling device is normally installed on the steering wheel prior to installation of the turn signal mechanism, the present invention eliminates the necessity of matching the mechanism with the canceling device during assembly line installation.

The embodiment of the invention described herein is for the purpose of illustration and the scope of the invention is intended to be limited only by the following claims.

I claim:

1. As an article of manufacture, a canceling device of cylindrical cross section having two axially spaced pairs of cams formed on the outer surface, one of said pairs of cams having a greater radius than the other, a flange extending from one end of said device and having a transversely-extending hollow boss.

2. As an article of manufacture, a canceling device of cylindrical cross section having two axially spaced pairs of cams formed on separate levels of the outer surface thereof, a flange extending from one end of said device and having a transversely-extending hollow boss.

3. As an article of manufacture, a canceling device having a stepped cylindrical bore defining a bi-level outer surface, a pair of cams extending from each level of said outer surface, a circular flange extending from the terminus of one of said surfaces and having a transversely-extending hollow boss.

4. As an article of manufacture, a canceling device having a stepped cylindrical bore defining an outer surface of two separate levels, a pair of cams circumferentially spaced on each of said levels, a circular flange extending transversely from said outer surface and having a hollow boss extending therefrom with the axis of the boss parallel to the axis of said bore.

5. As an article of manufacture, a canceling device for a turn signal mechanism having a cylindrical bore of a first radius at one end and a second radius at the other end to form a first and second level outer surface, a pair of circumferentially-spaced cams formed on each of said surfaces, a circular flange extending from said second level and having a transversely-extending hollow boss.

References Cited by the Examiner
UNITED STATES PATENTS

| 1,390,949 | 9/1921 | Yassenoff | 74—567 |
| 3,171,912 | 3/1965 | Lambert | 200—61.34 |
| 3,200,212 | 8/1965 | Barcus et al. | 200—61.34 |

BROUGHTON G. DURHAM, *Primary Examiner.*

W. S. RATLIFF, *Assistant Examiner.*